(12) United States Patent
Liu et al.

(10) Patent No.: US 8,331,605 B2
(45) Date of Patent: Dec. 11, 2012

(54) VOICE COIL AND LOUDSPEAKER USING THE SAME

(75) Inventors: Liang Liu, Beijing (CN); Jia-Ping Wang, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 309 days.

(21) Appl. No.: 12/824,338

(22) Filed: Jun. 28, 2010

(65) Prior Publication Data
US 2011/0064256 A1  Mar. 17, 2011

(30) Foreign Application Priority Data
Sep. 17, 2009 (CN) .......................... 2009 1 0190388

(51) Int. Cl.
*H04R 1/02* (2006.01)
(52) U.S. Cl. .......................... 381/394; 977/742; 977/949
(58) Field of Classification Search ........... 977/742.902, 977/949, 742, 902; 381/394, 423
See application file for complete search history.

(56) References Cited

U.S. PATENT DOCUMENTS

| | | | |
|---|---|---|---|
| 4,312,118 A | 1/1982 | Saik et al. | |
| 6,597,798 B1 * | 7/2003 | Nakazono et al. | 381/410 |
| 6,639,993 B2 * | 10/2003 | Kemmerer et al. | 381/397 |
| 6,808,746 B1 | 10/2004 | Dai et al. | |
| 8,068,626 B2 * | 11/2011 | Jiang et al. | 381/164 |
| 8,073,164 B2 * | 12/2011 | Jiang et al. | 381/164 |
| 2004/0020681 A1 | 2/2004 | Hjortstam et al. | |
| 2004/0053780 A1 | 3/2004 | Jiang et al. | |
| 2008/0248235 A1 | 10/2008 | Feng et al. | |
| 2008/0260188 A1 * | 10/2008 | Kim | 381/190 |
| 2008/0304694 A1 | 12/2008 | Hayashi | |
| 2009/0045005 A1 * | 2/2009 | Byon et al. | 181/167 |
| 2009/0068448 A1 | 3/2009 | Liu et al. | |
| 2009/0074228 A1 | 3/2009 | Mango, III et al. | |
| 2009/0153502 A1 | 6/2009 | Jiang et al. | |
| 2009/0155467 A1 | 6/2009 | Wang et al. | |
| 2009/0160799 A1 | 6/2009 | Jiang et al. | |
| 2009/0197082 A1 | 8/2009 | Jiang et al. | |
| 2009/0268559 A1 * | 10/2009 | Jiang et al. | 367/140 |
| 2009/0272935 A1 | 11/2009 | Hata et al. | |
| 2009/0296528 A1 * | 12/2009 | Jiang et al. | 367/140 |

(Continued)

FOREIGN PATENT DOCUMENTS
CN  2488247  4/2002
(Continued)

OTHER PUBLICATIONS

"Flexible, Stretchable, Transparent Carbon Nanotube Thin Film Loudspeakers" Lin Xiao et al. Nano Letters Oct. 29, 2008.*

(Continued)

*Primary Examiner* — Jeffrey Donels
(74) *Attorney, Agent, or Firm* — Altis Law Group, Inc.

(57) ABSTRACT

A loudspeaker includes a frame, a magnetic circuit, a voice coil bobbin and a voice coil. The magnetic circuit defines a magnetic gap. The frame is mounted on a side of the magnetic circuit. The voice coil bobbin is received in the magnetic gap. The voice coil is wound around the voice coil bobbin. The voice coil includes a lead wire. The lead wire includes a linear carbon nanotube structure and an insulated layer. The insulated layer is coated on the linear carbon nanotube structure.

20 Claims, 5 Drawing Sheets

U.S. PATENT DOCUMENTS

| | | | |
|---|---|---|---|
| 2010/0046784 A1* | 2/2010 | Jiang et al. | 381/386 |
| 2010/0188934 A1* | 7/2010 | Qian et al. | 367/140 |

FOREIGN PATENT DOCUMENTS

| | | |
|---|---|---|
| CN | 1430785 | 7/2003 |
| CN | 1640923 | 7/2005 |
| CN | 101239712 | 8/2008 |
| CN | 101288336 | 10/2008 |
| CN | 101321410 | 12/2008 |
| CN | 101381071 | 3/2009 |
| CN | 101464759 | 6/2009 |
| JP | 60-27298 | 2/1985 |
| JP | 63-49991 | 12/1988 |
| JP | 7-138838 | 5/1995 |
| JP | 2002-171593 | 6/2002 |
| JP | 2002-542136 | 12/2002 |
| JP | 2003-319490 | 11/2003 |
| JP | 2004-32425 | 1/2004 |
| JP | 2004-107196 | 4/2004 |
| JP | 2006-147801 | 6/2006 |
| JP | 2007-182352 | 7/2007 |
| JP | 2007-290908 | 11/2007 |
| JP | 2009-144158 | 7/2009 |
| JP | 2009-146420 | 7/2009 |
| JP | 2009-184910 | 8/2009 |

OTHER PUBLICATIONS

"Nanotubes made of carbon find an unexpected use." The Economist. Nov. 20, 2008.*

"Hot nanotube sheets produce music on demand." New Scientist. Oct. 31, 2008.*

Xiao et al.,Flexible, Stretchable, Transparent Carbon Nanotube Thin Film Loudspeakers,Nanoletter, vol. 8; No. 12, 4539-4545, Oct. 29, 2008.

* cited by examiner

VOICE COIL AND LOUDSPEAKER USING THE SAME

RELATED APPLICATIONS

This application claims all benefits accruing under 35 U.S.C. §119 from China Patent Application No. 200910190388.5, filed on Sep. 17, 2009 in the China Intellectual Property Office, hereby incorporated by reference. The application is also related to copending application entitled, "VOICE COIL AND LOUDSPEAKER USING THE SAME", filed Jun. 28, 2010 (Ser. No. 12/824,340).

BACKGROUND

1. Technical Field

The present disclosure generally relates to a voice coil incorporating carbon nanotubes and a loudspeaker using the same.

2. Description of Related Art

Loudspeakers are well known electric/acoustic conversion devices which convert electrical signals into acoustic signals. A conventional loudspeaker often includes a voice coil, a voice coil bobbin, a magnetic circuit, and a damper. The magnetic circuit is made up of a plate, a magnet, and a yoke, and is arranged at the lower end of the damper. High-density magnetic flux is formed in the magnetic gap between the yoke and the plate of the magnetic circuit. The voice coil is wound around the voice coil bobbin such that the voice coil and the voice coil bobbin can vibrate along the axial direction.

However, the voice coil of the conventional loudspeaker is made of a metal wire, such as copper wire coated by insulated materials. As such, the voice coil made of copper is heavy and requires more energy to vibrate. As such, the conventional loudspeaker has a low efficiency.

What is needed, therefore, is a lighter voice coil and a loudspeaker using the same, that has a high efficiency.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
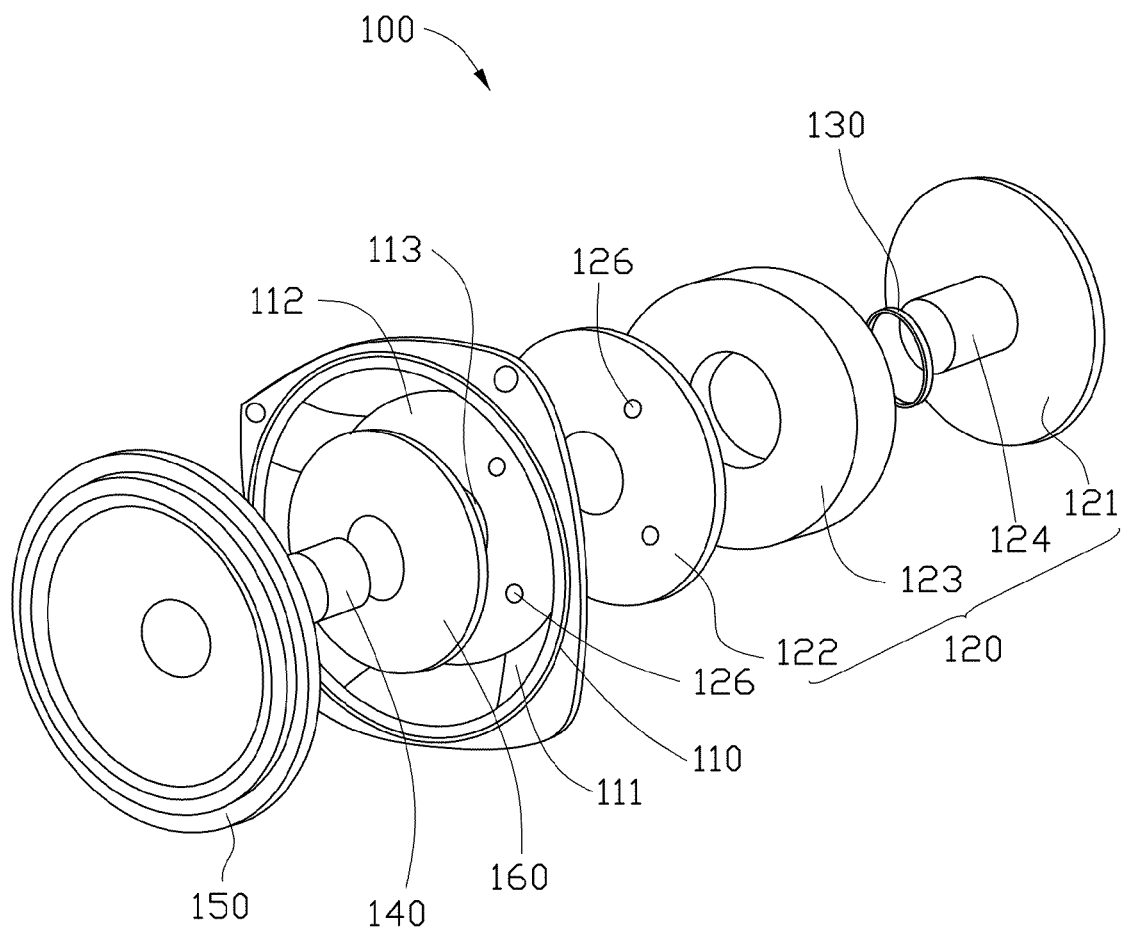
FIG. 1 is a schematic and exploded view of one embodiment of a loudspeaker.
Figure 2:
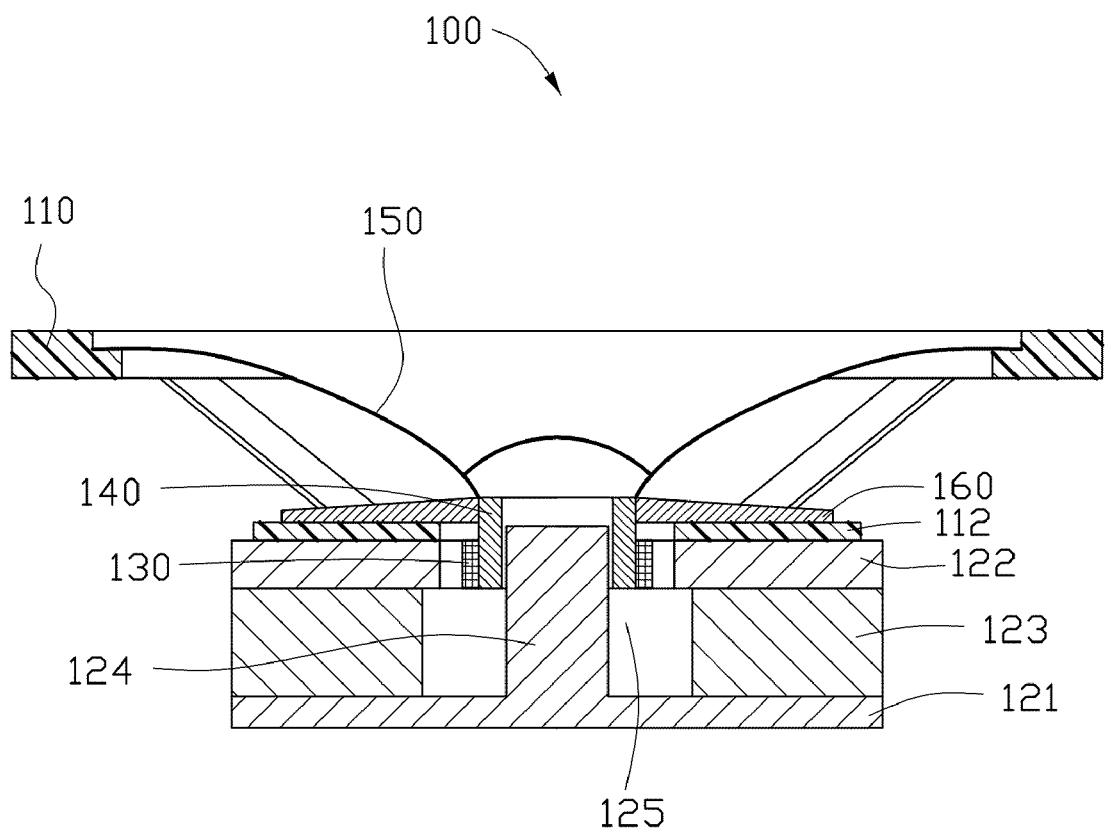
FIG. 2 is a schematic, cross-sectional view of the loudspeaker in FIG. 1.

Referring to FIGS. 1 and 2, one embodiment of a loudspeaker 100 includes a frame 110, a magnetic circuit 120, a voice coil 130, a voice coil bobbin 140, a diaphragm 150 and a damper 160. The frame 110 is mounted on a side of the magnetic circuit 120. The voice coil 130 is received by the magnetic circuit 120.

The frame 110 has a structure of a truncated cone with an opening (not labeled) on one end. The frame 110 has a bottom 112 and a hollow cavity 111. The hollow cavity 111 accepts the diaphragm 150 and the damper 160. The bottom 112 has a center hole 113. The bottom 112 of the frame 110 is fixed to the magnetic circuit 120.

The magnetic circuit 120 includes a lower plate 121, an upper plate 122, a magnet 123 and a magnet core 124. The magnet 123 is disposed between the upper plate 122 and the lower plate 121. The upper plate 122 and the magnet 123 can both be substantially ringed shape, and can define a substantially cylindrical shaped magnetic gap 125 in the magnet circuit 120. The magnet core 124 is fixed on the lower plate 121, received in the magnetic gap 125, and extends through the center hole 113 of the bottom 112. The magnetic circuit 120 is fixed on the bottom 112 via the upper plate 122. The upper plate 122 can be combined with the bottom 112 via adhesive or mechanical force. In one embodiment according to FIG. 1, the upper plate 122 is fixed on the bottom 112 by screws (not shown) via screw holes 126.

The diaphragm 150 is a sound producing member of the loudspeaker 100. The diaphragm 150 can have a cone shape if used in a large sized loudspeaker 100. If the loudspeaker 100 has a smaller size, the diaphragm 150 can have a planar round shape or a planar rectangle shape. A material of the diaphragm 150 can be aluminum alloy, magnesium alloy, ceramic, fiber, or cloth. In one embodiment according to FIG. 1, the diaphragm 150 has a cone shape. The diaphragm 150 includes an outer rim (not labeled) and an inner rim (not labeled). The outer rim of the diaphragm 150 is fixed to the open end of the frame 110, and the inner rim of the diaphragm 150 is fixed to the voice coil bobbin 140. Further, an external input terminal (not shown) can be attached to the frame 110. A dust cap can be fixed over and above a joint portion of the diaphragm 150 and the voice coil bobbin 140.

The damper 160 is a substantially ring-shaped plate having radially alternating circular ridges and circular furrows. The diaphragm 150 is held mechanically by the damper 160. The damper 160 is fixed to the bottom 112 of the frame 110. An inner rim of the damper 160 is connected with the voice coil bobbin 140. The damper 160 has a relatively high rigidity along the radial direction thereof, and a relatively low rigidity along the axial direction thereof, so that the voice coil bobbin 140 to freely move up and down but not radially.

The voice coil bobbin 140 is light in weight. The voice coil bobbin 140 has a tubular structure defining a hollow structure. The magnet core 124 is disposed in the hollow structure and spaced from the voice coil bobbin 140. The voice coil 130 winds around the voice coil bobbin 140. When the voice coil 130 vibrates, the voice coil bobbin 140 and the diaphragm 150 also vibrate with the voice coil 130 to produce sound. A material of the voice coil bobbin 130 can be polymer or paper. An outer diameter of the voice coil bobbin 140 can be determined by the power and the size of the loudspeaker 100. The outer diameter of the voice coil bobbin 140 can be in a range from about 1 millimeter to about 10 centimeters. A thickness of the voice coil bobbin 140 can be in a range from about 1 micrometer to about 200 micrometers.

Figure 3:
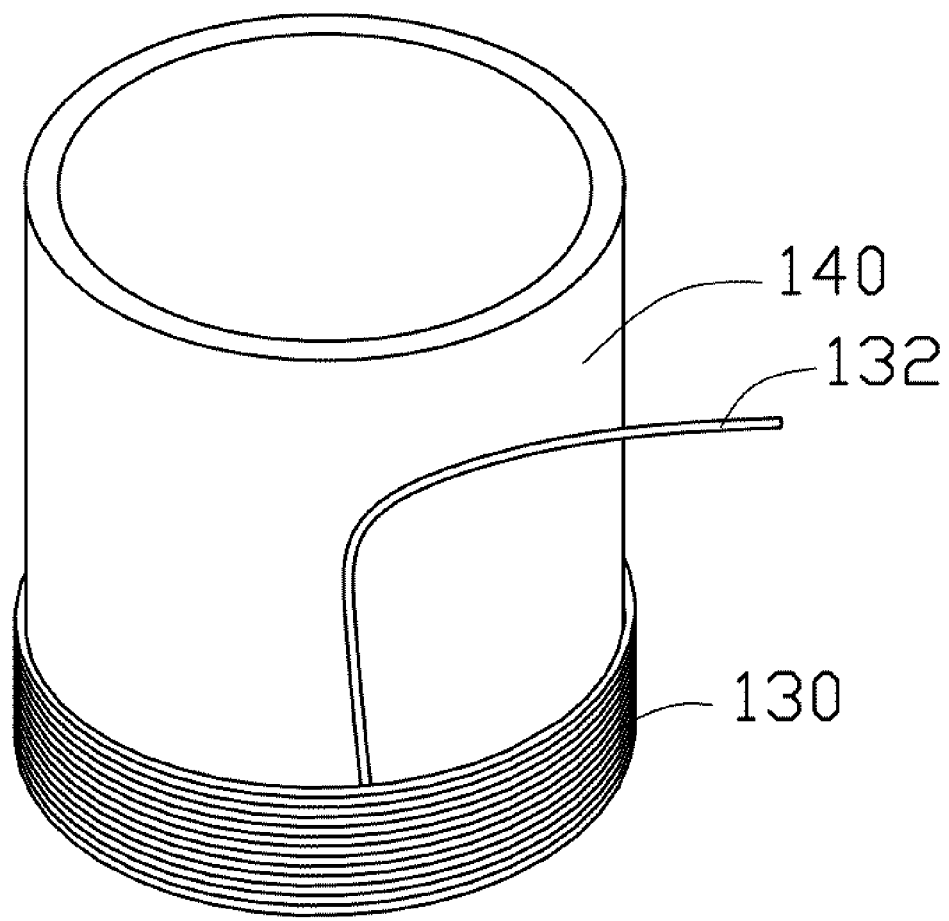
FIG. 3 is a schematic view of a voice coil and a voice coil bobbin used in the loudspeaker of FIG. 1.

The voice coil 130 is a driving member of the loudspeaker 100. Referring to FIG. 3, the voice coil 130 is disposed around an outer surface of the bobbin 140. When the electric signal is input into the voice coil 130, a magnetic field can be formed by the voice coil 130 as the variation of the electric signals.

The interacting of the magnetic filed caused by the voice coil 130 and the magnetic circuit 120 produces the vibration of the voice coil 130. The vibration of the voice coil 130 would, in turn, cause the voice coil bobbin 140 to vibrate, and then the diaphragm 150 fixed on the voice coil bobbin 140 will vibrate. The vibration of the diaphragm 150 causes the loudspeaker 100 to produce sound.

The voice coil 130 includes an end 132 electrically connected with an outer circuit. The voice coil 130 is formed by a lead wire (not labeled) wound around the voice coil bobbin 140. The lead wire twists around the voice coil bobbin 140 to form a plurality of wraps. The power rating of the loudspeaker 100 is related to the number of wraps. The more wraps of the voice coil 130, the higher the power rating of the loudspeaker 100.

The lead wire includes a conductive core and an insulated layer coated on a surface of the conductive core. A diameter of the lead wire can be in a range from about 0.1 millimeters to about 50 millimeters. A thickness of the insulated layer can be in a range from about 1 micrometer to about 0.1 millimeters. A material of the insulated layer can be a polymer. Examples of available polymers are polyethylene, polypropylene, polystyrene, polyvinyl chloride (PVC), epoxy resin, phenol formaldehyde resin, silica gel, polyester, polyethylene terephthalate (PET), polymethyl methacrylate (PMMA), or combinations thereof.

The conductive core of the lead wire includes a linear carbon nanotube structure. The linear carbon nanotube structure includes a plurality of carbon nanotubes joined end-to-end with each other by Van der Waals attractive force. The linear carbon nanotube structure can be a substantially pure structure of the carbon nanotubes, with few impurities. The carbon nanotubes have a low density, about 1.35 g/cm$^3$, so the voice coil 130 is light. As such, the efficiency of the loudspeaker 100 using the voice coil 130 will be improved. The carbon nanotubes in the linear carbon nanotube structure are substantially arranged along an axial direction of the linear carbon nanotube structure, so that the linear carbon nanotube structure has good conductivity along its axial direction. The linear carbon nanotube structure can be a free-standing structure, that is, the linear carbon nanotube structure can be supported by itself and does not need a substrate to lie on and be supported thereby. For example, if a point of the linear carbon nanotube structure was held, the entire linear carbon nanotube structure can be lifted without being destroyed. A diameter of the linear carbon nanotube structure can be in a range from about 0.05 millimeters to about 50 millimeters. A ratio of length to diameter of the linear carbon nanotube structure can be in a range from about 50:1 to about 5000:1.

The carbon nanotubes in the linear carbon nanotube structure can form one, two, or more carbon nanotube wires. If the linear carbon nanotube structure includes at least two carbon nanotube wires, the at least two carbon nanotube wires can be twisted with each other.

Figure 4:
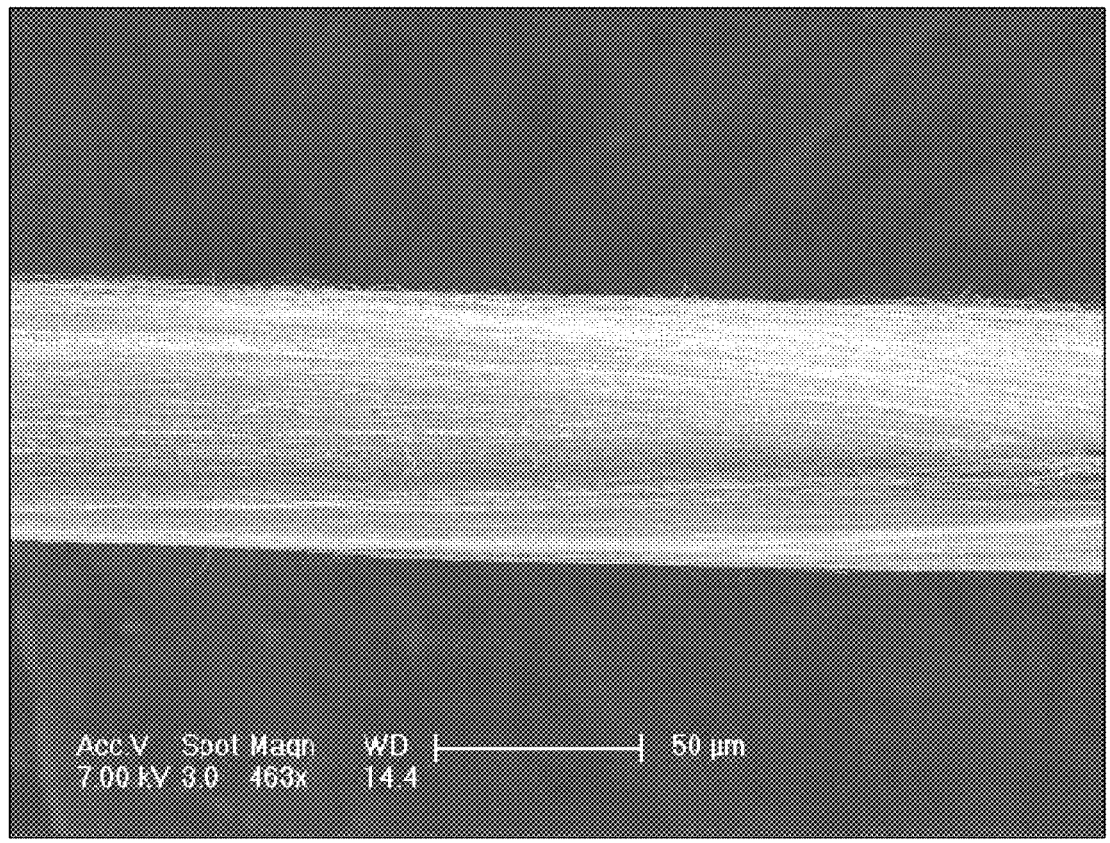
FIG. 4 is a Scanning Electron Microscope (SEM) image of an untwisted carbon nanotube wire.

The carbon nanotube wire can be untwisted or twisted. Referring to FIG. 4, the untwisted carbon nanotube wire includes a plurality of carbon nanotubes substantially oriented along a same direction (i.e., a direction along the length direction of the untwisted carbon nanotube wire). The carbon nanotubes are substantially parallel to the axis of the untwisted carbon nanotube wire. In one embodiment, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire ranges from about 50 nm to about 100 μm.

Figure 5:
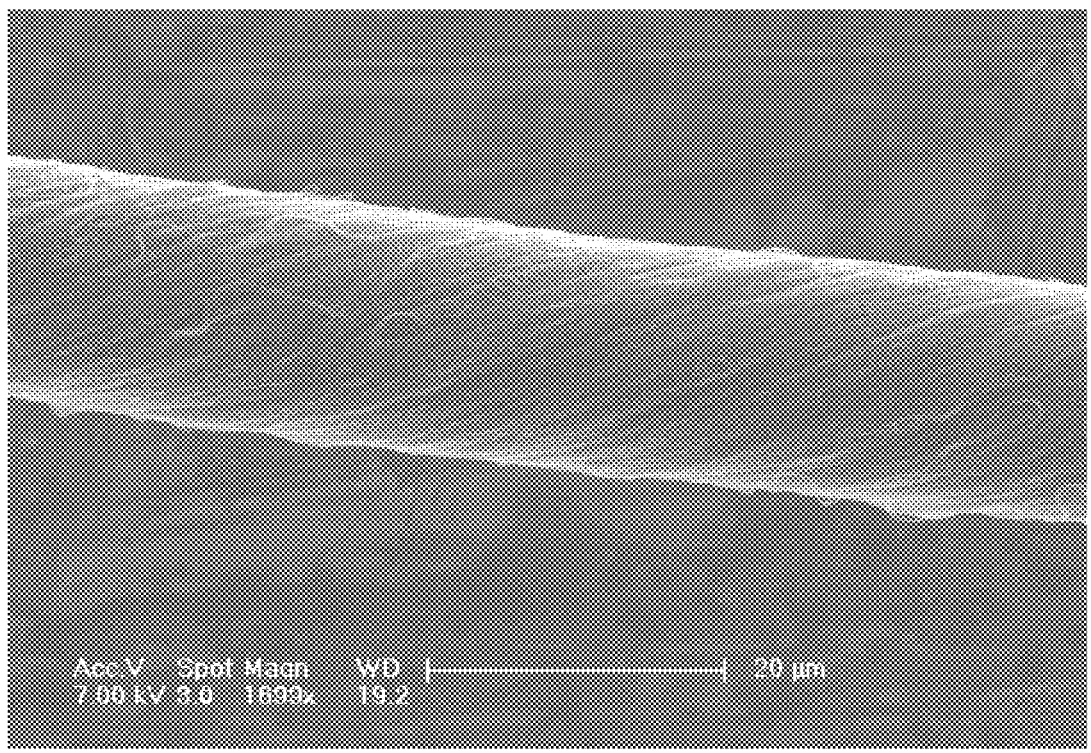
FIG. 5 is an SEM image of a twisted carbon nanotube wire.

Referring to FIG. 5, the twisted carbon nanotube wire includes a plurality of carbon nanotubes helically oriented around an axial direction of the twisted carbon nanotube wire. In one embodiment, the twisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The length of the carbon nanotube wire can be set as desired. A diameter of the twisted carbon nanotube wire can be from about 50 nm to about 100 μm. Furthermore, the twisted carbon nanotube wire can be treated with a volatile organic solvent after being twisted. After being soaked by the organic solvent, the adjacent substantially parallel carbon nanotubes in the twisted carbon nanotube wire will bundle together, due to the surface tension of the organic solvent when the organic solvent volatilizes. The specific surface area of the twisted carbon nanotube wire will decrease, while the density and strength of the twisted carbon nanotube wire will increase.

It is to be understood that the above-described embodiments are intended to illustrate rather than limit the present disclosure. Variations may be made to the embodiments without departing from the spirit of the embodiments as claimed. It is understood that any element of any one embodiment is considered to be disclosed to be incorporated with any other embodiment. The above-described embodiments illustrate the scope, but do not restrict the scope of the disclosure.

What claimed is:

1. A loudspeaker comprising:
a magnetic circuit defining a magnetic gap;
a voice coil bobbin received in the magnetic gap;
a voice coil wound around the voice coil bobbin, the voice coil comprising a lead wire comprising a linear carbon nanotube structure and an insulated layer coated on the linear carbon nanotube structure.

2. The loudspeaker of claim 1, wherein the linear carbon nanotube structure comprises a plurality of carbon nanotubes joined end-to-end with each other by Van der Waals attractive force.

3. The loudspeaker of claim 2, wherein the linear carbon nanotube structure is a pure structure consisting of the carbon nanotubes.

4. The loudspeaker of claim 2, wherein the carbon nanotubes in the linear carbon nanotube structure are substantially arranged along an axial direction of the linear carbon nanotube structure.

5. The loudspeaker of claim 1, wherein the linear carbon nanotube structure comprises a plurality of carbon nanotubes.

6. The loudspeaker of claim 1, wherein a diameter of the linear carbon nanotube structure is in a range from about 0.05 millimeters to about 50 millimeters, and a ratio of length to diameter of the linear carbon nanotube structure is in a range from about 50:1 to about 5000:1.

7. The loudspeaker of claim 1, wherein the linear carbon nanotube structure comprises at least one carbon nanotube wire.

8. The loudspeaker of claim 7, wherein the at least one carbon nanotube wire is an untwisted carbon nanotube wire comprising a plurality of carbon nanotubes substantially oriented in a same direction.

9. The apparatus of claim 8, wherein the carbon nanotubes are substantially parallel to an axis of the untwisted carbon nanotube wire.

10. The loudspeaker of claim 7, wherein the at least one carbon nanotube wire is a twisted carbon nanotube wire comprising a plurality of carbon nanotubes helically oriented around an axial direction of the twisted carbon nanotube wire.

11. The loudspeaker of claim 7, wherein the linear carbon nanotube structure comprises at least two carbon nanotube wires substantially parallel with each other.

12. The loudspeaker of claim 7, wherein the linear carbon nanotube structure comprises at least two carbon nanotube wires twisted with each other.

13. The loudspeaker of claim 1, wherein the lead wire of the voice coil twists around the voice coil bobbin to form a plurality of laps.

14. The loudspeaker of claim 1, wherein a material of the insulated layer is selected from the group consisting of polyethylene, polypropylene, polystyrene, polyvinyl chloride, epoxy resin, phenol formaldehyde resin, silica gel, polyester, polyethylene terephthalate, and polymethyl methacrylate.

15. The loudspeaker of claim 1, wherein a thickness of the insulated layer is in a range from about 1 micrometer to about 0.1 millimeters.

16. A loudspeaker comprising:
a voice coil bobbin;
a voice coil wound around the voice coil bobbin, the voice coil comprising a linear carbon nanotube structure comprising a plurality of carbon nanotubes joined end-to-end with each other and oriented along an axis of the linear carbon nanotube structure.

17. The loudspeaker of claim 16, wherein the voice coil further comprises an insulated layer coated on a surface of the linear carbon nanotube structure.

18. A voice coil for winding around a voice coil bobbin of a loudspeaker, the voice coil comprising:
a conductive core and an insulated layer disposed on an outer surface of the conductive core, the conductive core comprising a linear carbon nanotube structure comprising a plurality of carbon nanotubes.

19. The voice coil of claim 18, wherein the linear carbon nanotube structure is a pure structure consisting of carbon nanotubes joined end-to-end with each other.

20. The voice coil of claim 19, wherein a density of the conductive core is about $1.35 \text{ g/cm}^3$.

* * * * *